United States Patent
Ren et al.

(10) Patent No.: US 10,352,829 B2
(45) Date of Patent: Jul. 16, 2019

(54) AUTOMATIC CALIBRATION METHOD OF AN ANGLE SENSOR FOR AN AUTOMATIC DRIVE CONTROL SYSTEM OF A FARM MACHINE

(71) Applicant: SHANGHAI HUACE NAVIGATION TECHNOLOGY LTD, Shanghai (CN)

(72) Inventors: Qiang Ren, Shanghai (CN); Jiejun Wang, Shanghai (CN); Xuefeng Shen, Shanghai (CN); Shaoxi Feng, Shanghai (CN); Guangyang Dong, Shanghai (CN)

(73) Assignee: SHANGHAI HUACE NAVIGATION TECHNOLOGY LTD, Shangai (CN)

( * ) Notice: Subject to any disclaimer, the term of this patent is extended or adjusted under 35 U.S.C. 154(b) by 0 days.

(21) Appl. No.: 16/314,865

(22) PCT Filed: Jun. 20, 2017

(86) PCT No.: PCT/CN2017/089132
§ 371 (c)(1),
(2) Date: Jan. 3, 2019

(87) PCT Pub. No.: WO2018/076725
PCT Pub. Date: May 3, 2018

(65) Prior Publication Data
US 2019/0154546 A1   May 23, 2019

(30) Foreign Application Priority Data

Oct. 27, 2016  (CN) .......................... 2016 1 0956720

(51) Int. Cl.
*G01M 17/06* (2006.01)
*G01B 21/22* (2006.01)
(Continued)

(52) U.S. Cl.
CPC ........... *G01M 17/06* (2013.01); *B62D 15/021* (2013.01); *G01B 21/22* (2013.01); *G05D 1/0278* (2013.01);
(Continued)

(58) Field of Classification Search
CPC ..... G01M 17/06; G01B 21/22; G01C 25/005; B62D 15/021
(Continued)

(56) References Cited

U.S. PATENT DOCUMENTS 6,052,647 A * 4/2000 Parkinson ............... G01S 19/11
                                                    342/357.36
6,564,122 B1 * 5/2003 Huertgen ................. B60R 1/00
                                                    180/168
(Continued)

FOREIGN PATENT DOCUMENTS

CN       1550757 A    12/2004
CN       1550758 A    12/2004
(Continued)

*Primary Examiner* — Christopher W Fulton
(74) *Attorney, Agent, or Firm* — Gokalp Bayamoglu

(57) ABSTRACT

An automatic calibration method of an angle sensor for an automatic drive control system of a farm machine includes the following steps. S1: fixing a steering wheel of the farm machine to make front wheels of a vehicle kept at a fixed angle. S2: collecting a plurality of pieces of current position information of the farm machine, and processing the plurality of pieces of current position information to obtain an average value. S3: establishing a two-wheel farm machine kinematics model based on a center of a rear axle. S4: performing a radius calculation to obtain a set of angle correspondences. S5: rotating the farm machine by a preset angle at a constant speed with the rear axle of the farm machine as a center, and performing S1 through S4. S6: after
(Continued)

performing S5 for several times, performing an angle value fitting calculation to obtain a calibration coefficient.

5 Claims, 3 Drawing Sheets

(51) Int. Cl.
  *B62D 15/02* (2006.01)
  *G05D 1/02* (2006.01)
  *G01C 25/00* (2006.01)
(52) U.S. Cl.
  CPC ... *G01C 25/005* (2013.01); *G05D 2201/0201* (2013.01)
(58) Field of Classification Search
  USPC ............ 701/41, 518; 33/1 PT; 73/1.75
  See application file for complete search history.

(56) References Cited

U.S. PATENT DOCUMENTS

| | | | | |
|---|---|---|---|---|
| 6,728,615 | B1* | 4/2004 | Yao | B62D 6/008 |
| | | | | 180/402 |
| 2004/0117087 | A1* | 6/2004 | Dilger | B62D 15/02 |
| | | | | 701/41 |
| 2011/0144865 | A1* | 6/2011 | Niemz | B62D 5/0469 |
| | | | | 701/42 |
| 2012/0191268 | A1 | 7/2012 | Martin | |
| 2014/0005918 | A1 | 1/2014 | Qiang | |
| 2016/0052546 | A1* | 2/2016 | Arakane | B62D 15/025 |
| | | | | 701/41 |
| 2016/0147225 | A1* | 5/2016 | Sights | G05D 1/0088 |
| | | | | 701/23 |
| 2018/0373256 | A1* | 12/2018 | Runde | G05D 1/0221 |

FOREIGN PATENT DOCUMENTS

| | | |
|---|---|---|
| CN | 101334294 A | 12/2008 |
| CN | 102007417 A | 4/2011 |
| CN | 103994745 A | 8/2014 |
| CN | 104354764 A | 2/2015 |
| CN | 105172793 A | 12/2015 |
| CN | 105372078 A | 3/2016 |
| CN | 105523083 A | 4/2016 |
| CN | 105629973 A | 6/2016 |
| CN | 106004996 A | 10/2016 |
| JP | 5686703 B2 | 3/2015 |

* cited by examiner

AUTOMATIC CALIBRATION METHOD OF AN ANGLE SENSOR FOR AN AUTOMATIC DRIVE CONTROL SYSTEM OF A FARM MACHINE

CROSS REFERENCE TO RELATED APPLICATIONS

This application is the national phase entry of International Application No. PCT/CN2017/089132, filed on Jun. 20, 2017, which is based upon and claims priority to Chinese Patent Application No. 201610956720.4, filed on Oct. 27, 2016, the entire contents of which are incorporated herein by reference.

TECHNICAL FIELD

The present invention relates to the field of Global Navigation Satellite System (GNSS) receiver measurement, in particular to an automatic calibration method of angle sensor for automatic drive control system of farm machines.

BACKGROUND

The farm machine is the driving force for various mechanization operations, which is the most important power machine in agricultural production operations. The farm machine(s) can complete most work in fields together with attached, suspended, or towed agricultural implements. The farm machine(s) can also haul a trailer to perform transportation operations. With the continuous development of agricultural labor productivity, it is an inevitable tendency that agricultural tractors develop to larger scale. This tendency is of particular note in North America and Western Europe. In Northeast China and Xinjiang Province of China, there has been a sound momentum of development in recent years. As a result, users are becoming more and more dependent on high-power tractors in the agricultural production process, so it is particularly urgent to improve the utilization rate of the tractors at work. However, when the machine components of a tractor is operating in a relatively harsh environment, the operation conditions are complicated and changeable, and the workmanship of the operators is of varying level, which leads to a low operation precision and a low land utilization rate. Also, the fuel efficiency and production efficiency of the tractor in the operation process cannot be guaranteed. Therefore, the driving of farm machines, especially large-scale farm machines, has become a key issue urgently needing to be solved in precision farming. The most effective solution to this problem is GNSS navigation automatic drive technology.

The GNSS navigation automatic drive control system mainly consists of two major components: the integrated navigation algorithm and the control algorithm. The integrated navigation algorithm provides an accurate position and attitude data for the control algorithm. The deviation value is calculated in real time by the route planning algorithm based on the position and information. Then, the deviation value is converted into a control quantity of the actuator by the control algorithm, so as to control the tractor to travel according to the planned route. In these algorithms, a kinematic model of the vehicle should be established, and the rotation angle of the front wheel in the kinematic model is one of the most important parameters of the model. Due to the installation error and manufacturing error, unstable errors will occur in the model calculation. As a result, the control algorithm is inaccurate. Even worse, the control may be divergent, such that the intention of automatic drive cannot be realized.

SUMMARY

The present invention provides an automatic calibration method of an angle sensor for an automatic drive control system of a farm machine, which includes the following steps:

Step S1: fixing a steering wheel of the farm machine to make the front wheels of the vehicle at a fixed angle;

Step S2: collecting a plurality of pieces of current position information of the farm machine, and processing the plurality of pieces of current position information to obtain an average value;

Step S3: establishing a two-wheel farm machine kinematics model based on the center of a rear axle;

Step S4: performing a radius calculation to obtain a set of angle correspondences;

Step S5: rotating the farm machine by a preset angle at a constant speed with the rear axle of the farm machine as a center, and performing Step S1 through Step S4;

Step S6: after performing Step S5 several times, performing an angle value fitting calculation to obtain a calibration coefficient.

In the above-mentioned automatic calibration method of the angle sensor for automatic drive control system of farm machine, in step S6, the data of left turns and right turns of the vehicle is respectively collected for not less than 5 times.

In the above-mentioned automatic calibration method for the angle sensor of automatic drive control system of the farm machine, step S3 specifically includes:

assuming that the radius of the circles of the front and rear wheels is R, and obtaining Equation 1 below:

$$\beta = 2 * \operatorname{asin}\left(\frac{L}{2*R}\right)$$
$$\alpha = \beta/2$$

wherein $\alpha$ is a front wheel steering angle of the tractor, and L is a wheelbase of the tractor.

In Equation 1, $\beta$ is a corresponding central angle of the wheelbase L, and $\alpha$ is a corresponding circumferential angle of the wheelbase L. Equation 2 below is derived from Equation 1:

$$\alpha = \operatorname{asin}\left(\frac{L}{2*R}\right)$$

In the above-mentioned automatic calibration method for the angle sensor of automatic drive control system of farm machine, the steps for calculating radius R include:

$a=2*(x_2-x_1)$ $b=2*(y_2-y_1)$ $c=x_2^2+y_2^2-x_1^2-y_1^2$ $d=2*(x_3-x_2)$ $e=2*(y_3-y_2)$ $f=x_3^2+y_3^2-x_2^2-y_2^2$ $$x=(b*f-e*c)/(b*d-e*a)$$

$$y=(d*c-a*f)/(b*d-e*a)$$

$$R=((x-x_1)^2-(y-y_1)^2)^{0.5} \qquad \text{Equation 3}$$

Wherein a, b, c, d, e and f are intermediate calculation variables;

x and y are coordinates of a circle center;

$x_1$, $y_1$, $x_2$, $y_2$, $x_3$, $y_3$ are the coordinates of three points recorded during the driving process of the farm machine.

In the above-mentioned automatic calibration method for the angle sensor of automatic drive control system of the farm machine, the steps of the angle value fitting calculation include:

Assuming that a value of the angle sensor is $x_n$, a corresponding angle sensor value calculated according to the position sampling points in the Equation 3 is $y_n$, n is the n-$_{th}$ correspondence, and calibration quadratic coefficients of the angle sensor are $a_0$, $a_1$, and $a_2$.

$$\begin{bmatrix} 1 & x_1 & x_1^2 \\ 1 & x_2 & x_2^2 \\ \cdots & \cdots & \cdots \\ 1 & x_n & x_n^2 \end{bmatrix} \begin{bmatrix} a_0 \\ a_1 \\ a_2 \end{bmatrix} = \begin{bmatrix} y_1 \\ y_2 \\ \cdots \\ y_n \end{bmatrix} \qquad \text{Equation 4}$$

$a_0$, $a_1$ and $a_2$ are calibration results.

The present invention has the following advantages.

1. By applying the technique of combining vehicle kinematics and high-precision GNSS in the present application, a high-precision angle sensor calibration can be realized.

2. The present application can realize the automatic calibration without the external assisting apparatus and related experiential parameter input.

3. The present application is especially suitable for the precise agricultural automatic drive control systems.

BRIEF DESCRIPTION OF THE DRAWINGS

The present invention and characteristics, appearance, and advantages thereof will become clearer by reading the detailed description of the non-limiting embodiment with reference to the drawings below. In the drawings, identical reference numerals represent the same part. The drawings are drawn according to specific proportions, the emphasis of the drawings is to illustrate the substance of the present invention.

DETAILED DESCRIPTION OF THE EMBODIMENTS

In the following descriptions, numerous specific details are given for a complete understanding of the present invention. However, it is apparent to those skilled in the art that the present invention may be implemented without one or more of these details. In other examples, in order to avoid confusion with the present invention, some technical features known in the art are not described.

For a complete understanding of the present invention, detailed steps and detailed structures will be provided in the following descriptions in order to clearly illustrate the technical solution of the present invention. A preferred embodiment of the present invention is described in detail hereinafter. However, besides these detailed descriptions, the present invention may have other implementations.

The present invention provides an automatic calibration method of an angle sensor for an automatic drive control system of a farm machine, which includes the following steps.

Step S1: fixing a steering wheel of the farm machine to make the front wheels of the vehicle at a fixed angle;

Step S2: collecting a plurality of pieces of current position information of the farm machine, and processing the plurality of pieces of current position information to obtain an average value;

Step S3: establishing a two-wheel farm machine kinematics model based on the center of a rear axle;

Step S4: performing a radius calculation to obtain a set of angle correspondences;

Step S5: rotating the farm machine by a preset angle at a constant speed with the rear axle of the farm machine as a center, and performing Step S1 through Step S4;

Step S6: after performing Step S5 several times, performing an angle value fitting calculation to obtain a calibration coefficient.

In an optional embodiment of the present invention, the data of left turns and right turns of the vehicle is respectively collected for not less than 5 times.

Figure 1:
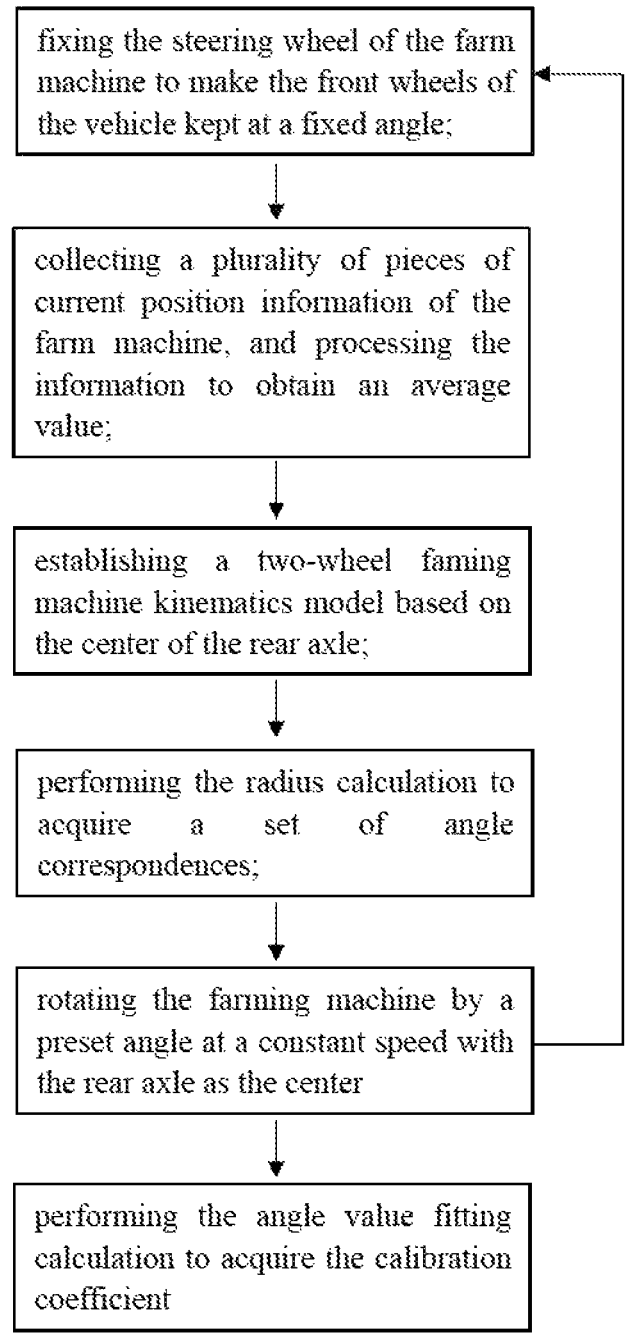
FIG. 1 is a flow chart showing an automatic calibration method for an angle sensor of an automatic drive control system of a farm machine according to the present invention.
Figure 2:
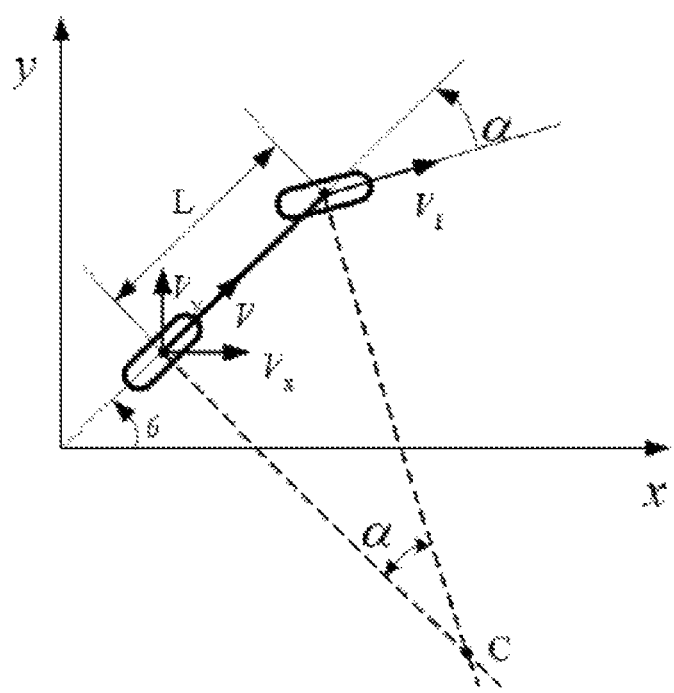
FIG. 2 is a schematic diagram showing a kinematic model of a two-wheel tractor based on a rear axle center.
Figure 3:
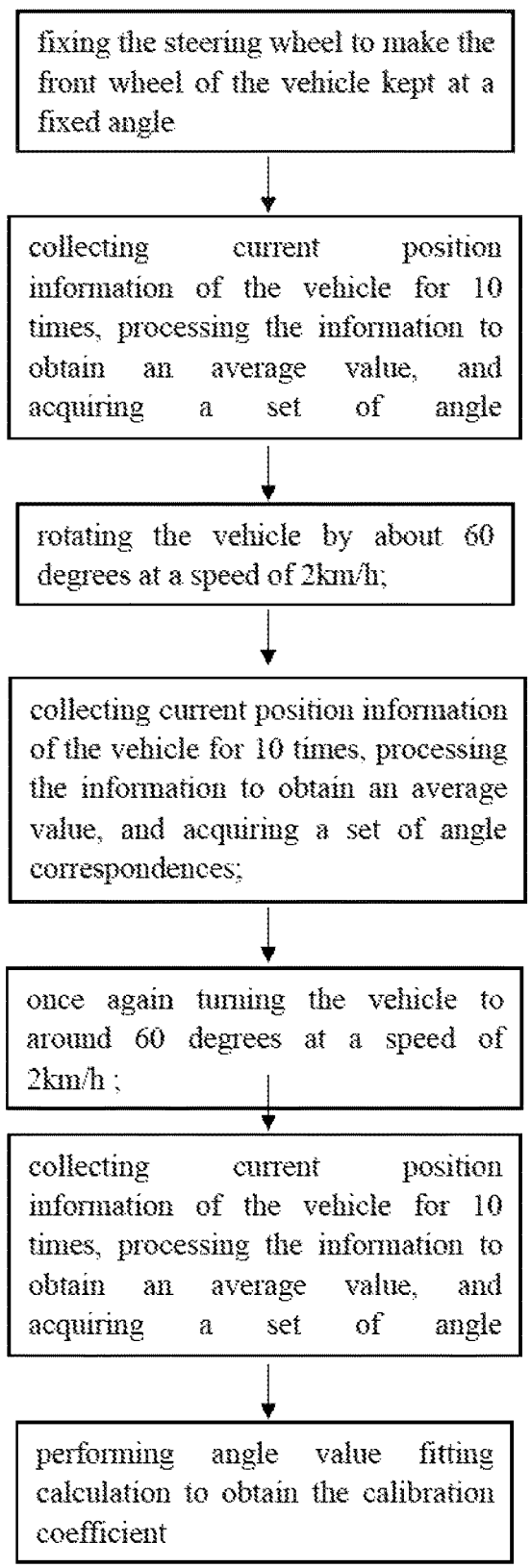
FIG. 3 is a flow chart of the present invention according to an embodiment.

FIG. 2 is a schematic diagram showing a kinematic model of a two-wheel tractor based on a rear axle center. In the figure, α is the front wheel steering angle of the tractor, V is the speed of the rear wheel of the tractor, $V_f$ is the speed of the front wheel of the tractor, L is the wheelbase (or chord length) of the tractor, point C is perpendicular to L and is located at the circumference of the circles of the front and rear wheels. Namely, α is the circumferential angle corresponding to the chord length L.

Assuming that the radius of the circles of the front and rear wheels is R, then $$\beta = 2*\operatorname{asin}\left(\frac{L}{2*R}\right) \qquad \text{Equation 1}$$

$$\alpha = \beta/2$$

In Equation 1, β is the central angle corresponding to the chord length L, and α is the circumferential angle corresponding to the chord length L. Also, α is equal to the value of the angle sensor of the front wheel. Equation 2 is derived from Equation 1, that is to say, the rotation angle of the front wheel and the radius have a non-linear correspondence. If the radius value can be known, the angle value of the front wheel can be acquired through reverse derivation:

$$\alpha = \operatorname{asin}\left(\frac{L}{2*R}\right). \qquad \text{Equation 2}$$

For high-precision GNSS, by using Real Time Kinematic (RTK) technology, the positioning accuracy can be improved to be within the range of 1 cm. In the automatic drive control system of a farm machine, the angle sensor is one of the components of the entire system, and the high-precision GNSS board is another component. Since the present patent focus on the research of angle sensor calibration, and does not involve RTK technology. The present application directly uses the position information output by the high-precision board in the implementations.

Equation 3 includes calculation formulas of an algebraic equation of a circle that is determined by three points. The coordinates of three points recorded during the driving process of the tractor are denoted by P1 $(x_1, y_1)$, P2 $(x_2, y_2)$ and P3 $(x_3, y_3)$. The steps of calculating the radius R include:

$$a=2*(x_2-x_1)$$

$$b=2*(y_2-y_1)$$

$$c=x_2^2+y_2^2-x_1^2-y_1^2$$

$$d=2*(x_3-x_2)$$

$$e=2*(y_3-y_2)$$

$$f=x_3^2+y_3^2-x_2^2-y_2^2$$

$$x=(b*f-e*c)/(b*d-e*a)$$

$$y=(d*c-a*f)/(b*d-e*a)$$

$$R=((x-x_1)^2-(y-y_1)^2)^{0.5} \quad \text{Equation 3}$$

wherein a, b, c, d, e and f are intermediate calculation variables; x, y are coordinates of circle center; $x_1$, $y_1$, $x_2$, $y_2$, $x_3$ and $y_3$ are the coordinates of three points recorded during the driving process of the farm machine.

According to Equation 2 and Equation 3, a radius value corresponding to the fixed front wheel rotation angle can be acquired. Theoretically, a corresponding line can be obtained according to two angle values and a radius value. However, due to the impacts of various environmental factors, the change of the angle value may not be linear. In order to improve the calibration accuracy, the present patent uses the least squares method of the quadratic curve to quadratically fit a plurality of angle values and radius values.

Assuming that the value of the angle sensor is $X_n$, the corresponding value of the angle sensor that is calculated by the position sampling points in the Equation 3 is $y_n$, n is the $n_{th}$ correspondence (i.e. rotating the farm machine the $n_{th}$ time), and the calibration quadratic coefficients of the angle sensor are $a_0$, $a_1$, and $a_2$.

$$\begin{bmatrix} 1 & x_1 & x_1^2 \\ 1 & x_2 & x_2^2 \\ \cdots & \cdots & \cdots \\ 1 & x_n & x_n^2 \end{bmatrix} \begin{bmatrix} a_0 \\ a_1 \\ a_2 \end{bmatrix} = \begin{bmatrix} y_1 \\ y_2 \\ \cdots \\ y_n \end{bmatrix} \quad \text{Equation 4}$$

$a_0$, $a_1$ and $a_2$ are the calibration results.

The present invention has the following advantages.

1. By applying the technique combining vehicle kinematics and high-precision GNSS in the present application, a high-precision angle sensor calibration can be realized.

2. The present application can realize the automatic calibration without the external assisting apparatus and related experiential parameter input.

3. The present application is especially suitable for the precise agricultural automatic drive control systems.

The preferred embodiment of the present invention has been described above. It should be understood that the present invention is not limited to the specific embodiments described above. Devices and structures that are not described in detail herein should be understood as being implemented in a common manner known in the art. Various possible changes and modifications or equivalent embodiments obtained by equivalent substitutions may be derived from the technical solution of the present invention according to the method and technical features recited above without departing from the technical solution of the present invention by any skilled person in the art, which do not have any impact on the essence of the present invention. Therefore, any simple modification, equivalent substitution and modification made based upon the above embodiment according to the technical essence of the present invention without departing from the content of the technical solution of the present invention should still be considered as falling within the scope of the technical solution of the present invention.

What is claimed is:

1. An automatic calibration method of an angle sensor for an automatic drive control system of a farm machine, wherein the method comprises the following steps:
   S1: fixing a steering wheel of the farm machine to make front wheels of a vehicle kept at a fixed angle;
   S2: collecting a plurality of pieces of current position information of the farm machine, and processing the plurality of pieces of current position information to obtain an average value;
   S3: establishing a two-wheel farm machine kinematics model based on a center of a rear axle;
   S4: performing a radius calculation to obtain a set of angle correspondences;
   S5: rotating the farm machine by a preset angle at a constant speed with the rear axle of the farm machine as a center, and performing S1 through S4;
   S6: after performing S5 for several times, performing an angle value fitting calculation to obtain a calibration coefficient.

2. The automatic calibration method of the angle sensor for the automatic drive control system of the farm machine of claim 1, wherein in S6, data of left turns and right turns of the vehicle are respectively collected for not less than 5 times.

3. The automatic calibration method of the angle sensor for the automatic drive control system of the farm machine of claim 1, wherein S3 comprises:
   assuming that a radius of a circle of a front wheel and a rear wheel is R, and obtaining equation set 1 below:

$$\beta = 2 * \operatorname{asin}\left(\frac{L}{2*R}\right)$$

$$\alpha = \beta/2$$

wherein $\alpha$ is a front wheel steering angle of the tractor, and L is a wheelbase of the tractor;
in equation set 1, $\beta$ is a corresponding central angle of the wheelbase L, and $\alpha$ is a corresponding circumferential angle of the wheelbase L; an equation 2 below is derived from the equation set 1:

$$\alpha = \operatorname{asin}\left(\frac{L}{2*R}\right).$$

4. The automatic calibration method of the angle sensor for the automatic drive control system of the farm machine of claim 3, wherein S4 comprise an equation set 3 below:

$$a = 2*(x_2 - x_1)$$

$$b = 2*(y_2 - y_1)$$

$$c = x_2^2 + y_2^2 - x_1^2 - y_1^2$$

$$d = 2*(x_3 - x_2)$$

$$e = 2*(y_3 - y_2)$$

$$f = x_3^2 + y_3^2 - x_2^2 - y_2^2$$

$$x = (b*f - e*c)/(b*d - e*a)$$

$$y = (d*c - a*f)/(b*d - e*a)$$

$$R = ((x - x_1)^2 - (y - y_1)^2)^{0.5}$$

x and y are coordinates of a circle center;
$x_1$, $y_1$, $x_2$, $y_2$, $x_3$, $y_3$ are coordinates of three points recorded during a driving process of the farm machine.

5. The automatic calibration method of the angle sensor for the automatic drive control system of the farm machine of claim 4, wherein the steps of the angle value fitting calculation comprise:
assuming that a value of the angle sensor is $x_n$, a corresponding angle sensor value is $y_n$, wherein $y_n$ is equal to y calculated according to the position sampling points in equation set 3, n is a n-$_{th}$ correspondence, and calibration quadratic coefficients of the angle sensor are $a_0$, $a_1$, and $a_2$;

$$\begin{bmatrix} 1 & x_1 & x_1^2 \\ 1 & x_2 & x_2^2 \\ \ldots & \ldots & \ldots \\ 1 & x_n & x_n^2 \end{bmatrix} \begin{bmatrix} a_0 \\ a_1 \\ a_2 \end{bmatrix} = \begin{bmatrix} y_1 \\ y_2 \\ \ldots \\ y_n \end{bmatrix};$$

and
$a_0$, $a_1$ and $a_2$ are calibration results.

* * * * *